Patented Feb. 22, 1944

2,342,295

UNITED STATES PATENT OFFICE 2,342,295

INTERPOLYMERIZATION PRODUCTS OF VINYL COMPOUNDS WITH CYCLIC IMIDES

Ludwig Orthner, Frankfort-on-the-Main, Heinz Sönke, Bad Soden in Taunus, and Ulrich Lampert, Frankfort-on-the-Main-Hochst, Germany, assignors, by mesne assignments, to General Aniline & Film Corporation, New York, N. Y., a corporation of Delaware No Drawing. Application October 7, 1938, Serial No. 233,744. In Germany October 9, 1937

6 Claims. (Cl. 260—84)

The present invention relates to interpolymerization products.

The polymerization products of unsaturated organic compounds generally have the drawback that their softening point is low. It is true that many polymerizates containing nitrogen have comparatively high softening points, but these are either still too low for. many purposes or cause a certain brittleness in the product. Furthermore, these products are apt to assume a form which cannot be worked up into colorless, completely transparent films, threads, plates or the like.

Now we have found that it is possible to make polymerization products which are surprisingly stable to heat but nevertheless possess excellent elasticity and are completely colorless. They may be worked up into very elastic limpid films, plates, threads or the like from their solutions or by a mechanical treatment. Such polymerizates are obtained by an interpolymerization from cyclic imides of unsaturated dicarboxylic acids or from N-alkyl- or N-cycloalkyl derivatives of these imides with compounds capable of being polymerized and containing the group

Unsaturated dicarboxylic acids, capable of forming imides and at the same time capable of forming interpolymerizates with other unsaturated compounds capable of being polymerized, are among others maleic acid and the substitution products thereof, such as halogen-maleic acids, citraconic acid, dimethyl-maleic acid, phenyl-maleic acid or the like, itaconic acid and the substitution products or derivatives thereof, such as methyl-itaconic acid; furthermore, among others, vinylsuccinic acid and glutaconic acid, which acids in the form of their di-esters may be transformed into an imide or an alkylimide.

The nitrogen of these imides may be substituted by methyl, ethyl, propyl, n-butyl, isobutyl, cyclohexyl or methylcyclohexyl. These substituted imides are obtainable according to known methods, for instance by the reaction of the acid anhydrides with amines so as to form the monoamides of the dicarboxylic acids and by a subsequent splitting off of water.

As compounds capable of being polymerized and containing the group

there may be used vinyl chloride, vinyl esters of organic carboxylic acids such as vinyl formate, vinyl acetate, vinyl propionate, vinyl butyrate, vinyl hexoate or vinyl butoxyacetate; styrene; vinyl methylether, vinyl ethylether, vinyl butylether or vinyl octodecylether; vinyl methylketone and acrylic acid esters such as the methyl-, ethyl- or butylesters.

The is suitably used about 1 mol of the imide for about 1 mol of the other polymerizable component. The polymerization may be carried out in the presence of the usual catalysts, for instance hydrogen peroxide, benzoyl peroxide or oleyl peroxide, and potassium persulfate. It may be carried out in the presence of solvents, in the form of an emulsion, for instance in an aqueous medium or without the application of solvents or diluents.

As regards the polymerizates obtained it is especially surprising that they have relatively good solubility, in spite of their extremely high stability to heat, i. e., they are readily soluble in solvents, such as chlorinated hydrocarbons; this is not the case with polymerizates having only approximately the same high stability to heat, such as polyvinyl chloride, polyacryl nitrile, polyvinylcarbazole.

The following examples serve to illustrate the invention, but they are not intended to limit it thereto; the parts are by weight:

(1) 55 parts of maleic acid-N-methylimide are mixed with 45 parts of vinyl acetate and 0.5 part of benzoylperoxide, 200 parts of methylene chloride are added and the solution is heated while stirring for 5–7 hours in a reflux apparatus. When polymerization is complete the highly polymeric product may be obtained, for instance, by evaporating the solvent or by a distillation with steam, from the syrup formed; or the syrup may be cast to form a film. After the distillation with steam and after drying it is a whitish powder which is insoluble in most of the solvents. It is more resistant to heat of about 100° C. than polyvinyl acetate is and may be shaped in spite of its relatively small solubility and its high resistance to heat.

(2) 60 parts of chloromaleic-acid-N-butylimide are heated, while stirring, in a reflux apparatus with 45 parts of vinyl ethyl ether and 1 part of benzoylperoxide in 200 parts of methylene chloride. The highly molecular product formed is isolated as described above.

(3) 50 parts of citraconic acid-N-methylimide, 25 parts of vinylmethylketone and 0.7 part of benzoylperoxide are together heated, while stirring, in a reflux apparatus in 200 parts of a solution of 2 per cent. strength of sodium polyacrylate. After some hours an emulsion has been formed from which the polymerizate may be precipitated in known manner by coagulating agents. After washing and drying there is obtained a white powder which is sparingly soluble, but may very well be shaped in organic solvents at sufficiently high temperatures.

(4) 27 parts of maleic acid-N-methylimide are stirred for 8 hours at 60° C.–65° C. together with 46 parts of butoxyvinylacetate and 0.5 part of benzoyl peroxide in 200 parts of methylene chloride. After the polymerization is complete the product is precipitated by introducing it, while stirring, into methanol. The white powder obtained is soluble in chlorinated hydrocarbons, alcohols and esters.

(5) 166 parts of maleic acid-N-methylimide are heated for 8 hours in a stirring autoclave to 90° C. together with 100 parts of vinylmethylether and 1 part of benzoylperoxide in 600 parts of methylene chloride. The product is worked up as described above. The interpolymerization product obtained is distinguished by a high stability to heat.

(6) 65 parts of vinyl chloride are heated for 8 hours in a stirring autoclave to 60° C.–70° C. together with 110 parts of maleic acid-N-methylimide, 0.3 part of benzoylperoxide and 40 parts of methylene chloride. The product is worked up as described above. The interpolymerization product is very sparingly soluble in hydrocarbons, alcohol and esters, but soluble in chlorinated hydrocarbons.

(7) 450 parts of maleic acid-N-methylimide are heated for 5 hours to 45° C.–50° C. together with 425 parts of styrene, 1 part of benzoyl peroxide and 1500 parts of methylene chloride. It may be suitable to dilute the very highly viscous solution produced with 750 parts of methylene chloride. The product is worked up as described above. The interpolymerization product obtained is distinguished by an extraordinary stability to heat and excellent mechanical properties.

(8) 31 parts of maleic acid-N-ethylimide are heated for 6 hours to 50° C.–55° C. together with 30 parts of vinylacetate, 0.5 part of benzoylperoxide and 70 parts of methylene chloride. The highly viscous solution is worked up as described above. If 28 parts of styrene are used instead of vinyl acetate, there is obtained an interpolymerization product of an extraordinary stability to heat and excellent mechanical properties.

(9) 36 parts of maleic acid-N-cyclohexylimide are heated for 6 hours to 50° C.–55° C. together with 22 parts of styrene, 0.2 part of benzoyl peroxide and 50 parts of methylene chloride. The interpolymerization product obtained is very readily soluble in chlorinated hydrocarbons and yields films which possess a good elasticity. If 30 parts of isohexylic acid vinyl ester are used instead of styrene, an interpolymerization product of the same good stability to heat is obtained.

(10) 36 parts of maleic acid-N-cyclohexylimide, 20 parts of vinylbutylether, 0.1 part of benzoyl peroxide together with 10 parts of methylene chloride are heated for 6 hours to 60° C. The interpolymerization product is worked up in the usual manner. 20 parts of vinylacetate may be used instead of vinylbutylether.

(11) 55 parts of maleic acid-N-methylimide, 50 parts of maleic anhydride, 105 parts of styrene together with 0.5 part of benzoyl peroxide and 350 parts of methylene chloride are heated for 8 hours to 60° C. The interpolymerization product worked up in the usual manner is distinguished by a high stability to heat.

(12) 28 parts of maleic acid-N-methylimide, 24.5 parts of maleic anhydride, 148 parts of octadecylvinylether are heated for 8 hours to 50° C.–55° C. together with 0.1 part of benzoyl peroxide and 200 parts of methylene chloride. The interpolymerization product obtained has very good mechanical properties and a high stability to heat.

(13) 90 parts of maleic acid-N-cyclohexylimide are heated for 7 hours to 55° C.–60 C. together with 60 parts of acrylic acid butyl ester and 0.5 part of benzoylperoxide in 300 parts of methylene chloride. The highly viscous solution is worked up as described above. The interpolymerization product thus obtained is distinguished by a very high stability to heat.

(14) 56 parts of maleic acid-N-methylimide and 65 parts of acrylic acid butyl ester are added, while well stirring, to a solution of 120 parts of water, 1.2 parts of a condensation product of dodecylene and sulfuric acid and 0.3 part of hydrogen peroxide of 30 per cent. strength. After the whole has been heated for 4 hours at 70° C.–75° C. a thin white emulsion is formed from which the interpolymerization product may be obtained in the form of a white powder by the addition of an electrolyte.

We claim:

1. Interpolymerization products of compounds containing the group

with compounds of the group consisting of cyclic imides of olefinic dicarboxylic acids, N-alkyl- and N-cycloalkyl-substitution products thereof.

2. Interpolymerzation products of about one mol of a compound containing the group

with about one mol of compound of the group consisting of cyclic imides of olefinic dicarboxylic acids, N-alkyl- and N-cycloalkyl-substitution products thereof.

3. The interpolymerization product of about one mol of styrene with about one mol of maleic acid-N-methylimide.

4. The interpolymerization product of about one mol of vinyl acetate with about one mol of maleic acid-N-methylimide.

5. The interpolymerization product of about 1 mol of acrylic acid butyl ester with about 1 mol of maleic acid-N-cyclohexylimide.

6. Interpolymerization products as defined in claim 1 wherein the cyclic imide is maleic acid imide.

LUDWIG ORTHNER.
HEINZ SÖNKE.
ULRICH LAMPERT.